United States Patent Office
3,377,347
Patented Apr. 9, 1968

3,377,347
CYCLOBUTENE DERIVATIVES
Erwin Friedrich Jenny, Riehen, and Karl Schenker, Basel, Switzerland, assignors to Ciba Corporation, New York, N.Y., a corporation of Delaware
No Drawing. Continuation-in-part of application Ser. No. 297,675, July 25, 1963. This application Mar. 18, 1966, Ser. No. 535,368
Claims priority, application Switzerland, Aug. 7, 1962, 9,414/62; June 14, 1963, 7,478/63; Dec. 28, 1965, 17,971/65
14 Claims. (Cl. 260—247)

ABSTRACT OF THE DISCLOSURE

Compounds of the formula

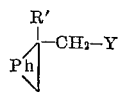

in which Ph represents an o-phenylene radical, Y an amino group and R' hydrogen or a substituted or unsubstituted alkyl radical, and their salts; also intermediates used for preparing the benzocyclobutenes. The final products possess analgesic, particularly antimorphine activity and also antitussive activity.

---

This is a continuation-in-part of our copending application Ser. No. 297,675, filed July 25, 1963, now abandoned.

The present invention relates to new benzocyclobutene derivatives. More especially it concerns benzocyclobutenes of the formula

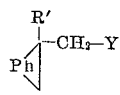

in which Ph represents an o-phenylene radical, Y an amino group and R' stands for hydrogen or a substituted or unsubstituted alkyl radical, and their salts.

The o-phenylene radical Ph may be unsubstituted or mono-, di- or poly-substituted. Substituents are primarily alkyl groups, for example lower alkyl groups such as methyl, ethyl, propyl, butyl, pentyl or hexyl groups, hydroxyl groups, alkoxy groups, for example lower alkoxy groups such as methoxy, methylenedioxy, ethoxy, propoxy, or butoxy groups, acyloxy groups, for example hydroxyl groups substituted by the acyl radicals mentioned below, amino groups such as free or acylated amino groups, for example amino groups substituted by the under-mentioned acyl radicals, or mono- or di-lower alkylated amino groups, for example amino groups substituted by the alkyl groups mentioned above, nitro groups, halogen atoms or trifluoromethyl groups.

Alkyl radicals R' are more especially the aforementioned. Substituents of the alkyl radical R' are, for example, hydroxyl groups, lower alkoxy groups, for example, those mentioned above, free or substituted amino groups, for example those mentioned above, or free or functionally converted carboxyl groups, such as cyano groups or esterified carboxyl groups, for example carbalkoxy groups, such as lower carbalkoxy groups, for example the carbethoxy group.

The amino group Y may be free or mono- or di-substituted. As substituents there are especially suitable substituted or unsubstituted hydrocarbon radicals, above all aliphatic, cycloaliphatic, cycloaliphatic-aliphatic or araliphatic hydrocarbon radicals which may be interrupted by hetero atoms such as oxygen, sulfur or nitrogen, being for instance alkyl, oxaalkyl, alkenyl, alkinyl, alkylene, oxaalkylene, azaalkylene, thiaalkylene, cycloalkyl, cycloalkenyl, cycloalkenyl-alkyl groups, oxacycloalkyl-alkyl, or aralkenyl radicals. As examples there may be mentioned lower alkyls such as methyl, ethyl, propyl, isopropyl, linear or branched butyl, pentyl, hexyl or heptyl groups bound in any desired position, lower oxaalkyl radicals such as 3-oxabutyl, 3-oxapentyl or 3-oxaheptyl radicals; lower alkenyl radicals such as allyl or methallyl, lower alkinyl radicals, such as the propargyl radical; lower alkylene radicals which may also contain a fused-on benzene ring, such as butylene-(1:4), butylene-(1:5), hexylene-(1:5), hexylene-(1:6), hexylene-(2:5), heptylene-(1:7), heptylene-(2:7), benz(2:3)-pentamethylene-(1:5), heptylene-(2:6); lower oxa-alkylene or azaalkylene radicals such as 3-oxa- or 3-aza-pentylene-(1:5), 3-oxa- or 3-azahexylene-(1:6), cyclopentyl, cyclohexyl, cyclopentyl or cyclohexenyl radicals, cyclopentyl-, cyclohexyl-, cyclopentyl-, cyclohexenyl-methyl or -ethyl radicals; furyl-lower alkyl radicals, such as the furfuryl radical, phenyl-lower alkyl or phenyl-lower alkenyl radicals which may also be substituted, for example in the manner defined above for the benzene nucleus, and/or interrupted by hetero atoms, for example those mentioned above, being for example benzyl, phenyl ethyl, phenyl propyl or anilino ethyl or anilino propyl groups. A substituted amino group Y is primarily a mono- or di-lower alkylamino group, such as the methylamino, dimethylamino, ethylamino or diethylamino group, phenyl-lower alkylamino groups such as the β-phenylethylamino group, or a benzylamino group, an N-lower alkyl-phenyl-lower alkylamino group such as the N-methyl- or N-ethyl-benzylamino or -phenylethylamino group or a pyrrolidino, piperidino, morpholino, thiamorpholino or piperazino group such, for example, as the N-methyl-piperazino group or the 1:2:3:4-tetrahydroisoquinolino group.

The new compounds possess valuable pharmacological, particularly analgesic properties. For example, in tests on mice they show an analgesic effect and are therefore useful as analgesics. The new compounds are also valuable intermediates, for example for the manufacture of medicaments.

Special mention deserve the compounds of the formula

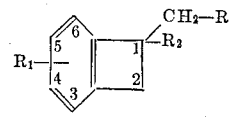

where R represents a free or substituted amino group, such as a mono- or di-lower alkylamino group, a pyrrolidino, piperidino, morpholino, thiamorpholino or piperazino group or a phenyl-lower alkylamino group; $R_1$ represents hydrogen, lower alkyl, hydroxyl, lower alkoxy, halogen or trifluoromethyl and $R_2$ represents a lower alkyl group or preferably hydrogen, especially the compounds of the formula

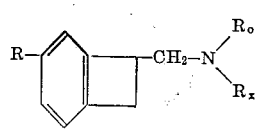

in which R stands for hydrogen or lower alkoxy, $R_o$ for lower alkyl or hydrogen and $R_x$ for lower alkyl or preferably for hydrogen- and particularly the 1-aminoethyl-benzococyclobutene.

Especially valuable with respect to its pharmacological properties is the 1-(ethylaminomethyl-5-methoxy-benzocyclobutene of the formula

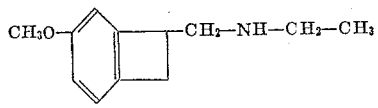

which, in addition to its analgesic, particularly antimorphine, action, which it displays in the animal test, for example on mice, has an antitussive effect, e.g., on cats and an elective inhibitory effect on expiratory activities as has been shown in animal tests, for example on the narcotized pigeon after tracheal blockage. This compound, in the free form or in the form of its salts, is consequently not only useful as an analgesic but also as an antitussive. Thus, for example, when the hydrochloride of the new compound is given intravenously in dosages from 3 to 10 mg. per kg. of bodyweight to the cat it displays a distinct antitussive effect and produces in a dosage of only 0.3 mg. per kg. bodyweight in the pigeon a pronounced inhibitory effect upon expiratory activities, and in a dosage of as little as 0.3 mg. per kg. bodyweight in the rabbit a distinct morphine-antagonistic effect.

The new compounds are obtained by methods known per se, preferably by reducing a compound of the formula

in which Ph and R' have the meanings given above, and, if desired substituting the free amino group in a resulting compound.

The reduction is carried out in the usual manner, for example with nascent hydrogen or with catalytically activated hydrogen, such as hydrogen in the presence of a metal catalyst, such as a palladium, nickel or platinum catalyst, or with a complex metal hydride, such as lithium aluminum hydride.

Another process for the manufacture of the new compounds consists in reducing a compound of the formula

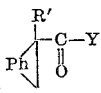

in which Ph, R' and Y have the meanings given above, or in reducing a compound of the formula

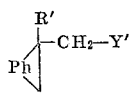

in which Ph and R' have the meanings given above Y' represents an acylamino group, such as an alkanoylamino group, for example a lower alkanoylamino group, such as an acetylamino, propionylamino or butyrylamino group or a benzoylamino group or phenyl-lower alkanoylamino group in which the phenyl nucleus may be substituted in the manner shown above for the o-phenylene radical. The reduction can be achieved, for example, by reaction with a di-light metal hydride, more especially an alkali metal+aluminum hydride, such as lithium aluminum hydride.

Another method for preparing the new compounds consists in reacting a compound of the formula

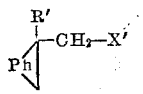

in which Ph and R' have the meanings given above and X' represents a reactive esterified hydroxyl group with ammonia or an amine of the formula HY, Y having the meaning given above. Reactive esterified hydroxyl groups are, for example, hydroxyl groups which are esterified with strong inorganic organic acids, preferably with a hydrohalic acid, such as hydrochloric, hydrobromic, or hydriodic acid, or with an arylsulfonic acid, such as benzenesulfonic or toluenesulfonic acid.

The above-mentioned reactions are conducted in known manner, in the presence or absence of diluents and/or condensing agents, at room temperature or below or above it, under atmospheric or superatmospheric pressure.

In the resulting compounds further substituents may be introduced or substituents already present therein may be eliminated or converted. Thus, a compound in which the amino group of the 1-aminomethyl radical contains at least one hydrogen atom may be substituted, for example alkylated. The alkylation may follow the usual practice and consist, for example, in the reaction with a reactive ester of alcohol, such as a lower alkanol or aralkanol, such as lower alkyl or aralkyl halides or sulfates, or corresponding esters of sulfonic acids, for example methyl, ethyl, propyl, isopropyl or benzyl chloride, bromide or iodide, dimethyl or diethyl sulfate, methane-, ethane-, or para-toluene-sulfonic acid methyl or ethyl ester or by reductive alkylation, that is to say by reaction with an oxo compound followed or accompanied by reduction. The reduction is performed in the usual manner, for example with hydrogen in the presence of a catalyst, such as platinum, palladium or nickel catalyst. A Schiff's base obtained as the condensation product may alternatively be reduced with an alkali metal-earth metal hydride, such as sodium borohydride or lithium aluminum hydride.

Compounds that contain a free hydroxyl group at the benzene nucleus may be alkylated or acylated by a known method. The alkylation may be carried out, for example, by reaction with a reactive ester of an alkanol, preferably in the presence of a strong base. The acylation is performed by reaction with an acid, preferably used in the form of a functional derivative thereof.

In compounds that contain at the benzene nucleus acyloxy or alkoxy groups, the acyl and alkyl groups respectively can be removed by hydrolysis.

The afore-mentioned reactions are performed in known manner, in the presence or absence of diluents and/or a condensing agent, at room temperature or below or above it, under atmospheric or superatmospheric pressure.

The invention further includes any variant of the present process in which an intermediate obtainable at any stage of the process is used as starting material and any remaining step or steps is/are carried out, or the process is discontinued at any stage thereof, or in which the starting materials are formed under the reaction conditions, or in which the reactants are used, if desired, in the form of their salts.

Depending on the reaction conditions and the starting materials used, the final products are obtained in the form of the free bases or in the form of their salts which are also included within the scope of the invention. For example, basic, neutral, acid or mixed salts, if desired also hemi-, mono-, sesqui- or polyhydrates thereof may be obtained. The salts of the final products may be converted in a manner known per se, for example with an alkali or an ion exchange resin, into the free bases. From the latter, salts may be obtained by reaction with an organic or inorganic acid, particularly an acid which is suitable for the formation of therapeutically acceptable salts, such acids are, for example: hydrohalic acids, sulfuric acids, phosphoric acids, nitric acid, perchloric acid: aliphatic, alicyclic, aromatic or heterocyclic carboxylic or sulfonic acids, such as formic, acetic, propionic, succinic, glycollic, lactic, malic, tartaric, citric, ascorbic, maleic, hydroxymaleic or pyruvic acid; phenylacetic, benzoic, p-aminobenzoic, anthranilic, p-hydroxybenzoic, salicylic or p-aminosalicylic acid, embonic acid, methanesulfonic, ethanesulfonic, hydroxyethanesulfonic, ethylenesulfonic acid; halogenbenzenesulfonic, toluenesulfonic, naphthalenesulfonic acids or sulfanilic acid; methionine, tryptophan, lysine or arginine.

These or other salts of the new compounds, for example the picrates, may also be used for purifying the resulting bases by converting the base into a salt, isolating the latter and liberating the base from the salt again. In view of the close relation between a base in the free form and in the form of a salt thereof, whenever a free base is referred to in this context, a corresponding salt is also intended, provided such is possible or appropriate under the circumstances.

The reactions of the invention are advantageously performed with those starting materials which give rise to the preferred compounds referred to above.

The starting materials are known or can be prepared by known methods.

The 1-cyano-benzocyclobutenes used as starting material are obtained, for example, by subjecting a β-[ortho-halogeno-phenyl]-propionitrile to intramolecular condensation in the presence of potassium amide, or by brominating a benzocyclobutene in position 1 with N-bromo-succinimide, followed by exchange of the bromine atom for a cyano group by means of sodium cyanide.

Those benzocyclobutenes, used as starting material, which contain an acid amide group in position 1, can be prepared by hydrolyzing the nitrile group in 1-cyano-benzocyclobutenes to the carbamyl group, or by hydrolyzing the nitrile group to the carboxyl group, converting the latter to an acid halide grouping or ester grouping, and reacting the latter groupings with ammonia or with an amine containing at least one hydrogen atom.

Starting materials that contain in position 1 a reactive esterified hydroxymethyl group are obtained, for example, by converting in a 1-cyano-benzocyclobutene the nitrile group into a carbalkoxy group in known manner, reducing the latter to the hydroxymethyl group and reactively esterifying the hydroxyl group in the latter. Alternatively 1-hydroxymethyl compounds can also be manufactured by reducing a benzocyclobutene that contains in position 1 an acyl group.

Any new starting material is likewise included in the present invention.

The new compounds may be used as medicaments for example in the form of pharmaceutical preparations containing them in free form or in form of their salts in admixture or conjunction with an organic or inorganic, solid or liquid excipient suitable for enteral or parenteral administration. Suitable excipients are substances that do not react with the new compounds, for example water, gelatine, lactose, starches, stearyl alcohol, magnesium stearate, talcum, vegetable oils, benzyl alcohols, gums, propylene glycol, polyalkylene glycols, white petroleum jelly, cholesterol or other known medicinal excipients. The pharmaceutical preparations may be, for example, tablets, dragees or capsules, or in liquid form solutions, suspensions or emulsions. They may be sterilized and/or may contain assistants, such as preserving, stabilizing, wetting or emulsifying agents, solutions promoters or salts for regulating the osmotic pressure, or buffers. They may also contain other therapeutically valuable substances. The pharmaceutical preparations are formulated by the conventional methods.

The new compounds may also be used in the form of animal feedingstuffs or of additives to such feedingstuffs, with the use, for example, of the conventional extenders and diluents of feedingstuffs.

The following examples illustrate the invention.

EXAMPLE 1

21.2 g. of 1-cyano-benzocyclobutene in 120 ml. of absolute ether are added dropwise to 6.2 g. of lithium aluminum hydride in 200 ml. of absolute ether with ice-cooling and stirring. The reaction mixture is then heated for 45 minutes at the boil. While cooling with ice and stirring there are then cautiously dropped in successively 6.2 ml. of water, 6.2 ml. of sodium hydroxide solution of 15% strength and 18.6 ml. of water. The batch is then suction-filtered and the filter cake is rinsed with ether. The combined filtrates are dried over sodium sulfate and evaporated under a water-jet vacuum at 30 to 40° C. The liquid radical is distilled under a water-jet vacuum, to yield 1-aminomethyl-benzocyclobutene of the formula

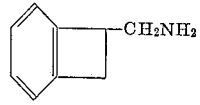

boiling at 98° C. under a pressure of 12 mm. Hg.

The hydrochloride is formed by adding hydrogen chloride in absolute ethyl acetate to the amine. The colorless crystals are recrystallized from absolute ethanol; they melt at 214–215 °C.

EXAMPLE 2

13.3 g. of 1-aminomethyl-benzocyclobutene are added dropwise to 25.5 g. of aqueous formic acid of 90% strength while cooling with ice. A boiling stone and 22.5 g. of aqueous formaldehyde solution of 37% strength are added to this solution and the flask is immersed in an oil bath previously heated to 90–100° C. After a few minutes a vigorous evolution of carbon dioxide sets in. When this strongly exothermic reaction has subsided, the flask is removed from the oil bath, and the batch is then maintained for 6 hours at 90–100° C. While cooling with ice, 50 ml. of 4 N-hydrochloric acid are added. The reaction mixture is then evaporated under a water-jet vacuum and the residue is taken up in 30 ml. of water. The aqueous solution is alkalinized with 25 ml. of 18 N-sodium hydroxide solution while being cooled with ice and then extracted with ether. The ethereal solution is washed with water until the washings run neutral, dried over sodium sulfate and evaporated. The liquid amine is converted into its hydrochloride with hydrogen chloride in absolute ethyl acetate. After recrystallization from alcohol+ethyl acetate+ether, 1-dimethylaminomethyl - benzocyclobutene hydrochloride of the formula

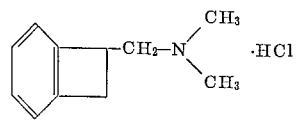

melting at 157–158° C. is obtained.

EXAMPLE 3

In a half-liter autoclave 25.9 grams of 1-cyano-benzocyclobutene in 100 ml. of liquid ammonia and 100 ml. of absolute alcohol are hydrogenated in the presence of 2.5 grams of Raney nickel under a pressure of 80 atmospheres of hydrogen at 85° C. When the reaction mixture is heated, the pressure rises to 95 atmospheres and then drops within 30 minutes to 75 atmospheres. The autoclave is cooled, atmospheric pressure is restored, the catalyst filtered off and the filtrate evaporated at a water-jet vacuum at 30° C. The oily radical is distilled and yields 1-aminomethyl-benzocyclobutene boiling at 97–98° C. at 12 mm. pressure of mercury. The product is identical with that described in Example 1.

EXAMPLE 4

A solution of 2.27 grams of N-furfuryl-benzocyclobutene-(1)-carboxylic acid amide in 20 ml. of absolute tetrahydrofuran is added dropwise to 1 gram of lithium aluminum hydride in 20 ml. of absolute tetrahydrofuran. The reaction mixture is boiled for 20 hours, cooled, and then treated successively with 1 ml. of water, 1 ml. of sodium hydroxide solution of 15% strength and 3 ml. of water. The precipitate is filtered with suction and the filtrate dried over sodium sulfate and then concentrated. The residue is distilled at 125° C. under 0.2 mm. pressure of mercury and converted with hydrogen chloride in ethyl acetate into crystalline 1-furfurylaminomethyl-benzocyclobutene hydrochloride of the formula

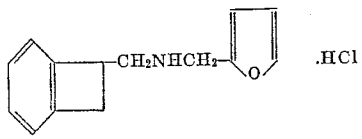

melting at 205° C.

The N-furfuryl-benzocyclobutene-(1)-carboxylic acid amide used as starting material may be prepared as follows:

1.66 grams of benzocyclobutenyl-(1)-carboxylic acid chloride in 10 ml. of absolute methylene chloride are added dropwise to 0.97 grams of furfurylamine and 0.81 ml. of absolute pyridine in 25 ml. of absolute methylene chloride. After 30 minutes, the reaction mixture is washed with 2 N-hydrochloric acid, 2 N-sodium carbonate solution and water. The organic phase is dried over sodium sulfate, filtered and evaporated. The crystalline residue is recrystallized from xylene and yields N-furfuryl-benzocyclobutene-(1)-carboxylic acid amide in the form of colorless needles melting at 104–106° C.

The above described acid chloride is obtained by conventional methods from the corresponding acid and thionyl chloride. It is a colorless liquid; boiling point 103–105° C. under 12 mm. pressure of mercury.

EXAMPLE 5

15.1 grams of 1-acetylaminomethyl-benzocyclobutene in 170 ml. of absolute tetrahydrofuran are added dropwise and with stirring to 6.8 grams of lithium aluminum hydride in 170 ml. of absolute tetrahydrofuran. The reaction mixture is then boiled for 6 hours under reflux, cooled, and 6.8 ml. of water, 6.8 ml. of sodium hydroxide solution of 15% strength and 20.3 ml. of water are added dropwise. The precipitate is filtered with suction, and the filtrate evaporated at a water-jet vacuum. The oily residue is treated with hydrogen chloride in ethyl acetate, the crystalline 1 - ethylaminomethyl-benzocyclobutene hydrochloride of the formula

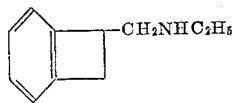

crystallizing out. Recrystallization from absolute alcohol yields colorless lamellae melting at 201–203° C.

The 1 - acetylaminomethyl-benzocyclobutene used as starting material may be obtained as follows:

60 ml. of freshly distilled acetic anhydride are added dropwise with ice-cooling and stirred to a mixture of 12.0 grams of 1 - aminomethyl-benzocyclobutene and 7.9 grams of absolute pyridine. The reaction mixture is allowed to stand overnight at room temperature and then evaporated at 60–70° C. at a water-jet vacuum. The residue is taken up in ether and washed six times with saturated aqueous sodium bicarbonate solution. The ether solution is then dried over sodium sulfate and evaporated. The oily residue is distilled in a bomb tube (bath temperature 115–120° C.; 0.02 mm. pressure of mercury) and yields 1 - (acetylaminomethyl)-benzocyclobutene as a colorless distillate which crystallizes spontaneously and can be recrystallized either from water or methylene chloride+petroleum ether; melting point: 72–75° C.

EXAMPLE 6

9.0 grams of crude 1 - [(α-anilinoacetyl)aminomethyl]-benzocyclobutene is dissolved in 80 ml. of absolute tetrahydrofuran and slowly added dropwise to a solution of 3.5 grams of lithium aluminum hydride in 80 ml. of absolute tetrahydrofuran. The reaction mixture is boiled for 20 hours, and then treated in succession with 3.5 ml. of water, 3.5 ml. of sodium hydroxide solution of 15% strength and 10.5 ml. of water. The precipitate is filtered off and the filtrate dried over sodium sulfate. The solvent is expelled to yield 1 - [(β-anilinoethyl)-aminomethyl]-benzocyclobutene of the formula

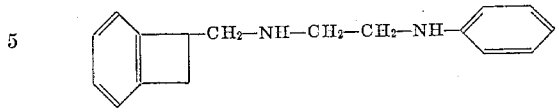

in the form of an oil boiling at 130° C. under 0.02 mm. pressure of mercury. The hydrochloride of the compound melts at 220° C.

The 1 - [(α-anilinoacetyl)-aminomethyl]-benzocyclobutene used as starting material is prepared as follows:

5.80 grams of N-carboxy anhydride of N-phenylglycine are added to a solution of 4.35 grams of 1-aminomethyl-benzocyclobutene in 20 ml. of methylene chloride. After the evolution of carbon dioxide has subsided, the reaction mixture is evaporated to yield as residue 1-[(α-anilinoacetyl)-aminomethyl]-benzocyclobutene of the formula

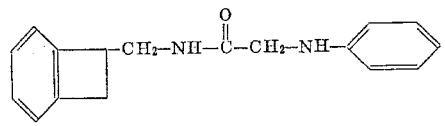

EXAMPLE 7

28.0 grams of 1 - [phenylacetylaminomethyl]-benzocyclobutene are dissolved in 100 ml. of absolute tetrahydrofuran and slowly added dropwise to a mixture of 4.0 grams of lithium aluminum hydride in 100 ml. of absolute tetrahydrofuran. The reaction mixture is boiled for 20 hours and then worked up by the method described in Example 6. The oily residue is treated in ethyl acetate with the calculated quantity of hydrochloric acid to yield 1 - [(β-phenylethyl)-aminomethyl]-benzocyclobutene hydrochloride of the formula

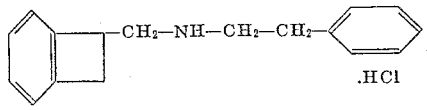

melting at 256–258° C.

The 1 - [phenylacetylaminomethyl]-benzocyclobutene used as starting material may be prepared as follows:

54.6 grams of phenylacetyl chloride in 100 ml. of absolute methylene chloride are added dropwise to a mixture of 42.8 grams of 1-aminomethyl-benzocyclobutene, 35.8 grams of triethylamine and 850 ml. of absolute methylene chloride. When the addition is complete, the reaction mixture is stirred for 15 minutes at room temperature. The clear reaction solution is then washed in succession with 2 N-hydrochloric acid, 2 N-sodium carbonate solution and water, dried over sodium sulfate, filtered and evaporated. The residue is distilled to yield 1-[phenylacetyl-aminomethyl]-benzocyclobutene as a colorless solid substance melting at 75–79° C. and boiling at 158° C. under 0.06 mm. pressure of mercury.

EXAMPLE 8

27 grams of lithium-aluminum hydride are cautiously mixed with 600 ml. of absolute tetrahydrofuran while being stirred and cooled with ice. 69 grams of 1-(acetyl-aminomethyl)-5-methoxy-benzocyclobutene in 600 ml. of absolute tetrahydrofuran are then stirred in with occasional cooling. The reaction mixture is then boiled for 10 hours under dry nitrogen and allowed to cool. While cooling with ice and stirring vigorously, 27 ml. of water, then 27 ml. of sodium hydroxide solution of 15% strength and finally 81 ml. of water are cautiously dropped in. The precipitate formed is suctioned off through Celite. The filter cake is rinsed with tetrahydrofuran. The filtrate is dried over sodium sulphate, filtered and evaporated under vacuum. The resulting residue is dissolved in ethyl acetate and mixed with hydrogen chloride dissolved in acetic acid, whereupon 1-(ethylaminomethyl)-5-methoxy-benzocyclobutene hydrochloride of the formula

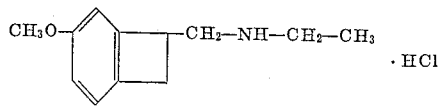

precipitates in the form of a colourless salt. On recrystallization from alcohol+ethyl acetate it forms colourless crystals melting at 169 to 171° C.

The 1-(acetylaminomethyl) - 5 - methoxy-benzocyclobutene used as starting material may be prepared in the following manner:

While cooling a mixture of 62 g. of 1-(aminomethyl)-5-methoxy-benzocyclobutene and 30 g. of absolute pyridine, 300 ml. of freshly distilled acetic anhydride are stirred in at a rate such that the internal temperature does not rise above 40 to 50° C. The batch is then left to itself for 4 hours at room temperature and evaporated under vacuum at 60 to 70° C. The residue is taken up in ether and repeatedly agitated with sodium bicarbonate solution. The ethereal solution is dried over sodium sulphate, filtered and evaporated. The residue, 1-(acetylaminomethyl)-5-methoxy-benzocyclobutene, is dried under a high vacuum. It is used for the reduction with lithium-aluminum hydride without first having been purified.

EXAMPLE 9

8.65 grams of 1-(p-toluenesulfonyloxymethyl)-benzocyclobutene in 10.0 ml. of absolute benzene are added dropwise to 7.7 grams of piperidine in 20 ml. of absolute benzene. The reaction mixture is boiled for 6 hours and then poured on to ice. The reaction product is extracted with ether and washed with water. The ether is evaporated and the residue distilled. The resulting oil is converted into the hydrochloride with alcoholic hydrochloric acid. The resulting 1-piperidinomethyl-benzocyclobutene hydrochloride of the formula

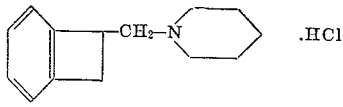

melts at 204–208° C. after recrystallization from absolute alcohol+ethyl acetate.

The following compounds may be prepared in an analogous manner:

| R | Boiling point under mm. Hg (free base) | Melting point of hydrochloride |
|---|---|---|
| (a) —NHCH₂CH₂NHC₆H₅ | 130°/0.02 | 220° |
| (b) —N(CH₃)(CH₂CH₂CH₂CH₃) | | 115° |
| (c) —N(CH₃)(CH₂C₆H₅) | 90°/0.04 | 160° |
| (d) —N(CH₂—CH=CH₂)₂ | 140°/12 | |
| (e) —N(piperazinyl)N—CH₃ | | ¹240° |
| (f) —N(decahydroquinolinyl) | 134°/0.02 | 205° |
| (g) —N(morpholinyl) | | 211° |

¹ Dihydrochloride.

EXAMPLE 10

17.2 grams of 1-cyano-1-(β-carbethoxy-ethyl)-benzocyclobutene in 100 ml. of absolute ether are added dropwise to 7.0 grams of lithium aluminum hydride in 250 ml. of absolute ether with ice-cooling and stirring. The reaction mixture is boiled for 45 minutes. 7.0 ml. of water, 7.0 ml. of sodium hydroxide solution of 15% strength and 21.0 ml. of water are then cautiously added dropwise in succession and with ice-cooling to the reaction mixture, which is then filtered with suction. The filtrate is dried over sodium sulfate and evaporated. On distillation the residue yields 1-aminomethyl-1-(γ-hydroxypropyl)-benzocyclobutene of the formula

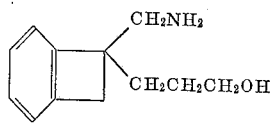

boiling at 130° C. under 0.02 mm. pressure of mercury.

The 1 - cyano-1-(β-carbethoxyethyl)-benzocyclobutene used as starting material may be obtained as follows:

1 to 2 ml. of trimethylbenzyl ammonium hydroxide in tertiary butanol are added in small portions to a mixture of 12.9 grams of 1-cyano-benzocyclobutene, 17 ml. of absolute tetrahydrofuran and 15.0 grams of acrylethyl ester. The reaction mixture heats up to 70° C., and is then allowed to stand overnight at room temperature. The reaction mixture is evaporated in vacuo at 40° C. and the ester extracted with methylene chloride. The organic phase is washed successively with water, N-hydrochloric acid, sodium carbonate solution and water and dried over sodium sulfate, filtered and evaporated. The oily residue yields on distillation 1-cyano-1-(β-carbethoxyethyl)-benzocyclobutene of the formula

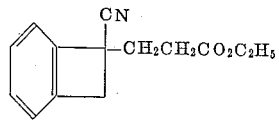

boiling at 121–123° C. under 0.07 mm. pressure of mercury.

EXAMPLE 11

9.6 grams of propargyl bromide in 75 ml. of absolute acetone are added dropwise to a mixture of 13 grams of 1-ethylaminomethyl-benzocyclobutene (cf. Example 5), 75 ml. of absolute acetone and 25 grams of anhydrous potassium carbonate. When the addition is complete, the reaction mixture is stirred for 2 hours at room temperature, the potassium carbonate is filtered with suction and the filtrate evaporated. The residue is taken up in ether and the amine extracted with 2 N-hydrochloric acid. The base is liberated by the addition of 2 N-sodium hydroxide solution at 0° C., taken up in ether and washed with water. The solution is dried over sodium sulfate, filtered and evaporated. The colorless oily residue yields on distillation 1-[(N-propargyl-ethylamino)-methyl]-benzocyclobutene of the formula

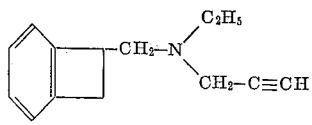

boiling at 65–67° C. under 0.03 mm. pressure of mercury. By treatment with hydrochloric acid in ethyl acetate the amine can be converted into the crystalline hydrochloride melting at 135–136° C.

EXAMPLE 12

12.8 grams of 1-cyano-5-methoxy-benzocyclobutene in 100 ml. of liquid ammonia and 100 ml. of absolute alcohol are hydrogenated in a 1/2-litre autoclave in the presence of 1.3 grams of Raney nickel under a hydrogen pressure of 80 atmospheres at 85° C. After about 30 minutes, the autoclave is allowed to cool, the pressure is released, the catalyst filtered off and the filtrate evaporated at 30° C. at a water-jet vacuum. The oily residue is distilled and yields 1-aminomethyl-5-methoxy-benzocyclobutene of the formula

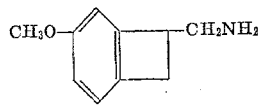

boiling at 68–73° C. under 0.05 mm. pressure of mercury.

For the preparation of the hydrochloride the amine is treated with hydrogen chloride in absolute ethyl acetate. The colourless crystals are recrystallized from absolute ethyl alcohol+ethyl acetate:melting point: 165–167° C.

The 1-cyano-5-methoxy-benzocyclobutene used as starting material may be obtained as follows:

A mixture of 64.5 grams of 3-bromo-4-methoxybenzaldehyde, 60 grams of malonic acid, 120 ml. of absolute pyridine and 3 ml. of piperidine is maintained at 100° C. for 2 hours and then poured into a mixture of 175 ml. of concentrated hydrochloric acid and 300 grams of ice with stirring. The acid which crystallizes out is filtered with suction and washed with 25 ml. of hydrochloric acid of 10% strength and twice with 25 ml. of water each time. Recrystallization of the filter residue from dimethylformamide+alcohol yields 3-bromo-4-methoxy-cinnamic acid melting at 241–243° C.

91.5 grams of 3-bromo-4-methoxy-cinnamic acid are catalytically hydrogenated in 1100 ml. of alcohol of 95% strength in the presence of 9 grams of Raney nickel at room temperature and under normal pressure. The catalyst is filtered off and the filtrate evaporated at 40° C. at a water-jet vacuum. The ultraviolet spectrum of the crystalline residue shows that the hydrogenation of 3-bromo-4-methoxy-cinnamic acid to 3-bromo-4-methoxy-hydrocinnamic acid was complete.

10 grams of the so-obtained crude hydrocinnamic acid are boiled under reflux with about 20 ml. of thionyl chloride for 2 to 4 hours. The clear solution is freed from the excess thionyl chloride at 40° C. at a water-jet vacuum. The oily residue yields on distillation 7.8 grams of 3-bromo-4-methoxy-phenyl-propionyl chloride boiling at 133–136° C. under 0.1 mm. pressure of mercury.

10 grams of 3-bromo-4-methoxyphenyl-propionyl chloride are added dropwise to a concentrated solution of aqueous ammonia with stirring and ice-cooling. The amide which precipitates is filtered with suction and washed with water. After drying in vacuo over calcium chloride colourless, crude 3-bromo-4-methoxy-phenyl propionamide is obtained. For conversion into the nitrile the amide need not be purified any further.

25.8 grams of the so-prepared and dried amide are dissolved in 25 ml. of absolute pyridine and reacted with 21 grams of paratoluenesulfonic chloride in small portions at a temperature between 0 and 40° C. with stirring. After the exothermic reaction has subsided, the solution is allowed to cool to room temperature and is then poured into a mixture of ice and water with stirring. The batch is stirred for about 10 minutes at room temperature and the nitrile is then extracted with ether. The ethereal solution is washed with water, 2 N-sodium carbonate solution and again with water, dried over sodium sulphate, filtered and evaporated. The colorless oily residue yields on distillation 3-bromo-4-methoxy-phenylpropionitrile of the formula

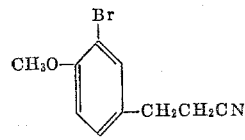

boiling at 130–134° C. under 0.03 mm. pressure of mercury.

22 grams of potassium are added in small portions to 250 ml. of absolute liquid ammonia and a pinch of iron trinitrate. 25 grams of 3-bromo-4-methoxyphenylpropionitrile are added dropwise to the potassium amide solution within 1 to 2 minutes and the reaction mixture is then stirred for 15 minutes. 40 grams of ammonium chloride are then introduced cautiously. The ammonia is allowed to evaporate and 100 to 150 ml. of water are then added to the residue. The organic material is extracted with ether. The ethereal phase is washed five times with water, dried over sodium sulphate, filtered and evaporated. The dark oily residue yields on distillation 1-cyano-5-methoxy-benzocyclobutene of the formula

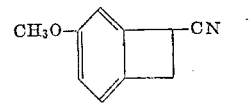

as a colorless liquid boiling at 105–115° C. under 0.15 mm. pressure of mercury.

EXAMPLE 13

4.2 grams of 1-cyano-4:5-methylenedioxy-benzocyclobutene in 80 ml. of liquid ammonia and 80 ml. of absolute alcohol are hydrogenated in a 1/2-liter autoclave in the presence of 0.5 gram of Raney nickel under a hydrogen pressure of 80 atmospheres at 85° C. After about 30 minutes, the autoclave is allowed to cool, the pressure is released, the catalyst filtered off and the filtrate evaporated at 30° C. at a water-jet vacuum. The residue is distilled and yields 1-aminomethyl-4:5-methylenedioxy-benzocyclobutene of the formula

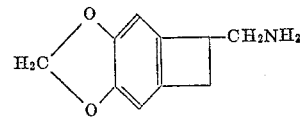

boiling at 95° C. under 0.1 mm. pressure of mercury.

For the preparation of the hydrochloride the amine is treated with hydrogen chloride in absolute ethyl acetate. The colorless crystals are recrystallized from absolute ethyl alcohol or water. Melting point: 265° C. (dec.).

The 1-cyano - 4:5 - methylenedioxy-benzocyclobutene used as starting material may be obtained as follows:

A mixture of 76.3 grams of 6-bromo-piperonal, 60 grams of malonic acid, 120 ml. of absolute pyridine and 3 ml. of piperidine is maintained at 100° C. for 2 hours and then poured into a mixture of 175 ml. of concentrated hydrochloric acid and 300 grams of ice with stirring. The acid which crystallizes out is filtered with suction and washed with 25 ml. of hydrochloric acid of 10% strength and twice with 25 ml. of water each time. Recrystallization of the filter residue from dimethylformamide+alcohol yields 2-bromo-4:5-methylenedioxy-cinnamic acid melting at 257–260° C.

27.0 grams of 2-bromo-4:5-methylenedioxy-cinnamic acid are catalytically hydrogenated in 100 ml. of N-sodium hydroxide solution and 350 ml. of water in the presence of 3 grams of Raney nickel at room temperature and under atmospheric pressure. The catalyst is filtered off, the filtrate evaporated at 40° C. at a water-jet vacuum and the residue acidified at 0° C. with concentrated hydrochloric acid. The ultraviolet spectrum of the filtered, crystalline residue shows that the hydrogenation of 2-bromo-4:5-methylenedioxy-cinnamic acid to the corresponding hydrocinnamic acid was complete.

25 grams of the so-obtained crude hydrocinnamic acid are boiled under reflux for 2 hours with about 25 ml. of thionyl chloride and 50 ml. of benzene. The clear solution is evaporated at 40° C. at a water-jet vacuum. On distillation the oily residue yields 19.9 grams of 2-bromo-4:5-methylenedioxy-phenyl-propionyl chloride boiling at 150–152° C. under 0.18 mm. pressure of mercury.

19.9 grams of 2-bromo-4:5-methylenedioxy-phenyl-propionyl chloride in 40 ml. of absolute tetrahydrofuran are added dropwise to 250 ml. of a solution of ammonia saturated at 0° C. in absolute tetrahydrofuran with stirring and ice-cooling. The ammonium chloride which precipitates is filtered with suction after 3 hours and washed with chloroform. The filtrate is evaporated in vacuo. The residue taken up in chloroform is washed with ice-water, 10.7 grams of 2-bromo-4:5-methylenedioxy-phenyl-propionamide melting at 150–153° C. crystallizing out. For conversion into the nitrile the amide need not be purified further.

12.7 grams of the so-prepared and dried amide are dissolved in 12 ml. of absolute pyridine and reacted with 9.8 grams of para-toluene-sulphochloride in small portions at a temperature between 0 and 40° C. with stirring. After the exothermic reaction has subsided, the solution is allowed to cool to room temperature and is then poured with stirring into a mixture of ice and water. The batch is stirred for about 10 minutes at room temperature and the nitrile then extracted with ether. The ethereal solution is washed with water, 2 N-sodium carbonate solution and again with water, dried over sodium sulphate, filtered and evaporated. On distillation the colorless oily residue yields 10.1 grams of solid 2-bromo-4:5-methylenedioxy-phenylpropionitrile of the formula

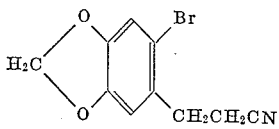

boiling at 130–132° C. under 0.04 mm. pressure of mercury and melting at 73–76° C.

10.6 grams of potassium are added in small portions to 125 ml. of absolute liquid ammonia and a pinch of iron trinitrate. 12.6 grams of pulverized 2-bromo-4:5-methylenedioxy-phenylpropionitrile are added to the potassium amide solution within 1 to 2 minutes and the reaction mixture is then stirred for 15 minutes. 20 grams of ammonium chloride are then introduced cautiously. The ammonia is allowed to evaporate and 50 to 100 ml. of water are then added to the residue. The organic material is extracted with ether. The ethereal phase is washed five times with water, dried over sodium sulfate, filtered and evaporated. On distillation the solid residue yields crystalline 1-cyano-4:5-methylenedioxy-benzocyclobutene of the formula

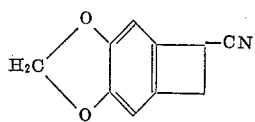

boiling at 115–120° C. under 0.10 mm. pressure of mercury. The compound can be recrystallized from methyl alcohol; melting point: 84–87° C.

We claim:
1. A compound selected from the group consisting of a benzocyclobutene of the formula

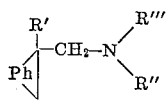

in which Ph stands for a member selected from the group consisting of ortho-phenylene, ortho-phenylene monosubstituted by a member selected from the group consisting of lower alkyl, hydroxyl, lower alkoxy, lower alkanoyloxy, benzoyloxy, phenyl-lower alkanoyloxy, amino, mono-lower alkylamino, di-lower alkylamino, halogen and trifluoromethyl, and orthophenylene disubstituted by a member selected from the group consisting of lower alkyl, lower alkoxy, methylenedioxy, lower alkanoyloxy, benzoyloxy, phenyl-lower alkanoyloxy, amino, mono-lower alkylamino, di-lower alkylamino, halogen and trifluoromethyl, R' stands for a member selected from the group consisting of hydrogen, lower alkyl, and hydroxy-lower alkyl, R'' and R''' each stands for a member selected from the group consisting of hydrogen, lower alkyl, lower alkenyl, lower alkinyl, cyclo-lower alkyl, cyclo-lower-alkenyl, cyclo-lower alkyl-lower alkyl, cyclo-lower alkenyl-lower alkyl, furyl-lower alkyl, phenyl-lower alkenyl, phenyl-lower alkyl, lower alkyl-phenyl-lower alkyl, hydroxyl-phenyl-lower alkyl, lower alkoxy-phenyl-lower alkyl, amino-phenyl-lower alkyl, mono-lower alkylamino phenyl-lower alkyl, di-lower alkylamino-phenyl-lower alkyl, halogeno-phenyl-lower alkyl, trifluoromethylphenyl-lower alkyl and anilino-lower alkyl, and when taken together with the nitrogen atom, R''' and R'' stand for lower alkyleneinino, morpholino, thia-morpholino, piperazino, tetrahydroisoquinolino and benz-lower alkyleneinino, and its acid addition salts, each of said cyclo-lower alkyl and cyclo-lower alkenyl groups having up to 7 ring carbon atoms.

2. A product as claimed in claim 1, wherein Ph stands for

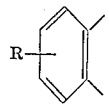

R representing a member selected from the group consisting of hydrogen, lower alkyl, hydroxyl, lower alkoxy, halogen and trifluoromethyl, R' stands for hydrogen and R'' and R''' each represents hydrogen, lower alkyl, phenyl-lower alkyl, anilino-lower alkyl, lower alkenyl, lower alkinyl and furfuryl, and, when taken together with the nitrogen atom, for a member selected from the group consisting of pyrrolidino, piperidino, morpholino, N-methylpiperazino and 1,2,3,4-tetra-hydroisoquinolino.

3. A product as claimed in claim 1, wherein Ph stands for

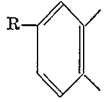

R representing a member selected from the group consisting of hydrogen and lower alkoxy, R' stands for hydrogen and R'' and R''' each for a member selected from the group consisting of lower alkyl and hydrogen.

4. A product as claimed in claim 1, wherein Ph stands for

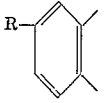

R representing a member selected from the group consisting of hydrogen and lower alkoxy, R' and R'' stands for hydrogen and R''' for lower alkyl.

5. A product as claimed in claim 1, wherein Ph stands for orthophenylene, R' for hydrogen and the symbol

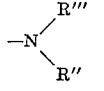

for a member selected from the group consisting of furfurylamino, phenylethylamino, diallylamino, benzylmethylamino, propargylethylamino, piperidino and morpholino.

6. A compound as claimed in claim 1, which compound is the 1-aminomethyl-benzocyclobutene or an acid addition salt thereof.

7. A compound as claimed in claim 1, which compound is the 1-(ethylaminomethyl)-5-methoxy-benzocyclobutene or an acid addition salt thereof.

8. A compound as claimed in claim 1, which compound is the 1-dimethylaminomethyl-benzocyclobutene or an acid addition salt thereof.

9. A compound as claimed in claim 1, which compound is the 1-ethylaminomethyl-benzocyclobutene or an acid addition salt thereof.

10. A compound as claimed in claim 1, which compound is the 1-[(β-anilinoethyl)-aminomethyl]-benzocyclobutene or an acid addition salt thereof.

11. A compound as claimed in claim 1, which compound is the 1-[(N-methyl-n-butylamino)-methyl]-benzocyclobutene or an acid addition salt thereof.

12. A compound as claimed in claim 1, which compound is the 1-(N-methylpiperazinomethyl)-benzocyclobutene or an acid addition salt thereof.

13. A compound as claimed in claim 1, which compound is the 1-(1:2:3:4-tetrahydroisoquinolino-methyl)-benzocyclobutene or an acid addition salt thereof.

14. A compound as claimed in claim 1, which compound is the 1-aminomethyl-5-methoxy-benzocyclobutene or an acid addition salt thereof.

References Cited
UNITED STATES PATENTS 3,149,159  9/1964  Kaiser et al. _____ 260—570.8

OTHER REFERENCES

Caca et al.: J. Am. Chem. Society, vol. 80, pages 2257–63, page 2260 relied on only (1958).

Blomquist et al.: Ann., vol. 653, pages 67–79, page 71 relied on (1962).

ALEX MAZEL, *Primary Examiner.*

NICHOLAS S. RIZZO, *Examiner.*

J. TOVAR, *Assistant Examiner.*

UNITED STATES PATENT OFFICE
CERTIFICATE OF CORRECTION

Patent No. 3,377,347                                    April 9, 1968

Erwin Friedrich Jenny et al.

It is certified that error appears in the above identified patent and that said Letters Patent are hereby corrected as shown below:

Column 2, line 4, after "oxacycloalkyl-alkyl," insert -- aralkyl --; lines 71 and 72, "1-aminoethyl-benzocococyclobutene" should read -- 1-aminomethyl-benzocyclobutene --.

Signed and sealed this 20th day of January 1970.

(SEAL)
Attest:

Edward M. Fletcher, Jr.                    WILLIAM E. SCHUYLER, JR.
Attesting Officer                              Commissioner of Patents